(12) United States Patent
Zimmer et al.

(10) Patent No.: US 7,562,209 B2
(45) Date of Patent: Jul. 14, 2009

(54) SUPPORTING DIFFERENT INSTRUCTION SET ARCHITECTURES DURING RUN TIME

(75) Inventors: Vincent J. Zimmer, Federal Way, WA (US); Michael A. Rothman, Puyallup, WA (US)

(73) Assignee: Marvell International, Ltd., Hamilton (BM)

(*) Notice: Subject to any disclaimer, the term of this patent is extended or adjusted under 35 U.S.C. 154(b) by 626 days.

(21) Appl. No.: 10/819,788

(22) Filed: Apr. 7, 2004

(65) Prior Publication Data

US 2005/0240753 A1    Oct. 27, 2005

(51) Int. Cl.
*G06F 15/177* (2006.01)
*G06F 15/76* (2006.01)
*G06F 12/00* (2006.01)

(52) U.S. Cl. .................... 713/2; 713/1; 713/100; 712/200

(58) Field of Classification Search .............. 713/1, 713/2, 100; 712/200
See application file for complete search history.

(56) References Cited

U.S. PATENT DOCUMENTS

| 5,854,913 | A  | * | 12/1998 | Goetz et al. ............ 712/210 |
| 6,081,890 | A  | * | 6/2000  | Datta .................... 713/1 |
| 6,219,774 | B1 | * | 4/2001  | Hammond et al. ......... 711/202 |
| 6,601,166 | B1 | * | 7/2003  | Ayyar et al. ............. 713/2 |
| 6,829,725 | B2 | * | 12/2004 | Gurumoorthy et al. ..... 714/23 |
| 7,114,064 | B2 | * | 9/2006  | Ramesh et al. ............ 713/1 |
| 7,165,135 | B1 | * | 1/2007  | Christie et al. ......... 710/269 |
| 2004/0031018 | A1 | * | 2/2004 | Marty .................. 717/120 |

\* cited by examiner

*Primary Examiner*—Thomas Lee
*Assistant Examiner*—Fahmida Rahman

(57) ABSTRACT

A platform may use heterogeneous instruction set architectures which may be called during run time. Using a system table, an operating system may be directed to the appropriate services for any of two or more instruction set architectures during run time.

18 Claims, 3 Drawing Sheets

SUPPORTING DIFFERENT INSTRUCTION SET ARCHITECTURES DURING RUN TIME

BACKGROUND

This invention relates generally to firmware for processor-based systems.

Processor-based systems may use firmware for booting an operating system. Generally, firmware initiates a system using a particular instruction set architecture. For example, a 32 bit Pentium® architecture platform boots in a flat model protected mode using 32 bit callable interfaces in a 4 gigabyte address space.

After booting, the operating system takes control during a stage called run time. The run time system still uses the same instruction set architecture. However, newer systems can support 32 bit or 64 bit instruction set architectures during run time. A number of other instruction set architectures are also available.

An operating system that was booted in a particular 32 bit instruction set architecture has no support for calling back into the 32 bit mode from the kernel during run time. This problem is addressed by one manufacturer by simply prohibiting the kernel from calling back from one instruction set architecture into another instruction set architecture. See BIOS and Kernel Developer's Guide for AMD Athlon™ 64 and AMD Opteron™ Processors, Publication No. 26094, Revision 306, dated September 2003, available from Advanced Micro Devices, Inc., Sunnyvale, Calif. While this certainly overcomes the problem, it does so in a relatively inflexible way.

Thus, there is a need for ways to enable call backs by an operating system kernel to an instruction set architecture different from the one used to boot the system.

DETAILED DESCRIPTION

Figure 1:
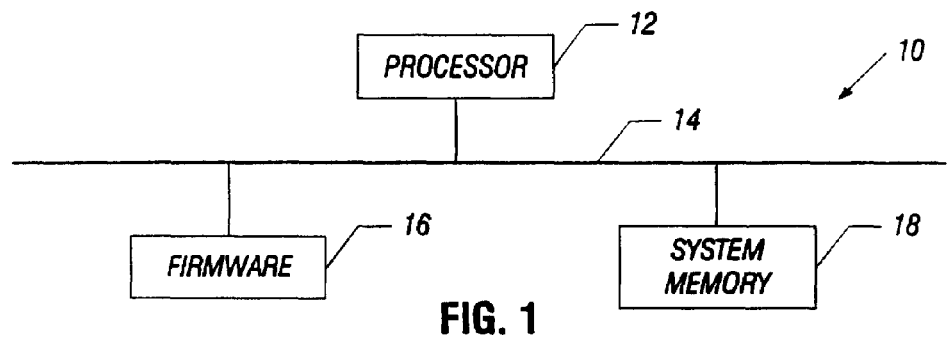
FIG. 1 is a schematic depiction of a platform in accordance with one embodiment of the present invention.

Referring to FIG. 1, a platform or processor-based system 10 may include a processor 12 coupled by a bus 14 to system memory 18 and a firmware storage 16. The firmware storage 16 may store the firmware for executing the boot sequence and the power on self-test. The firmware 16 may be a basic input/output system and it may include an extensible firmware interface application program interface in some embodiments of the present invention.

In order to boot an operating system, the firmware stored in the firmware storage 16 is loaded into system memory 18 and executed to configure the system 10 in a given instruction set architecture. The given instruction set architecture may be preset by the firmware stored in the storage 16. Available instruction set architectures include 32 bit instruction set architecture such as real-mode legacy basic input/output system, protected mode extensible firmware interface, and 64 bit instruction set architectures available from various manufacturers.

Figure 2:
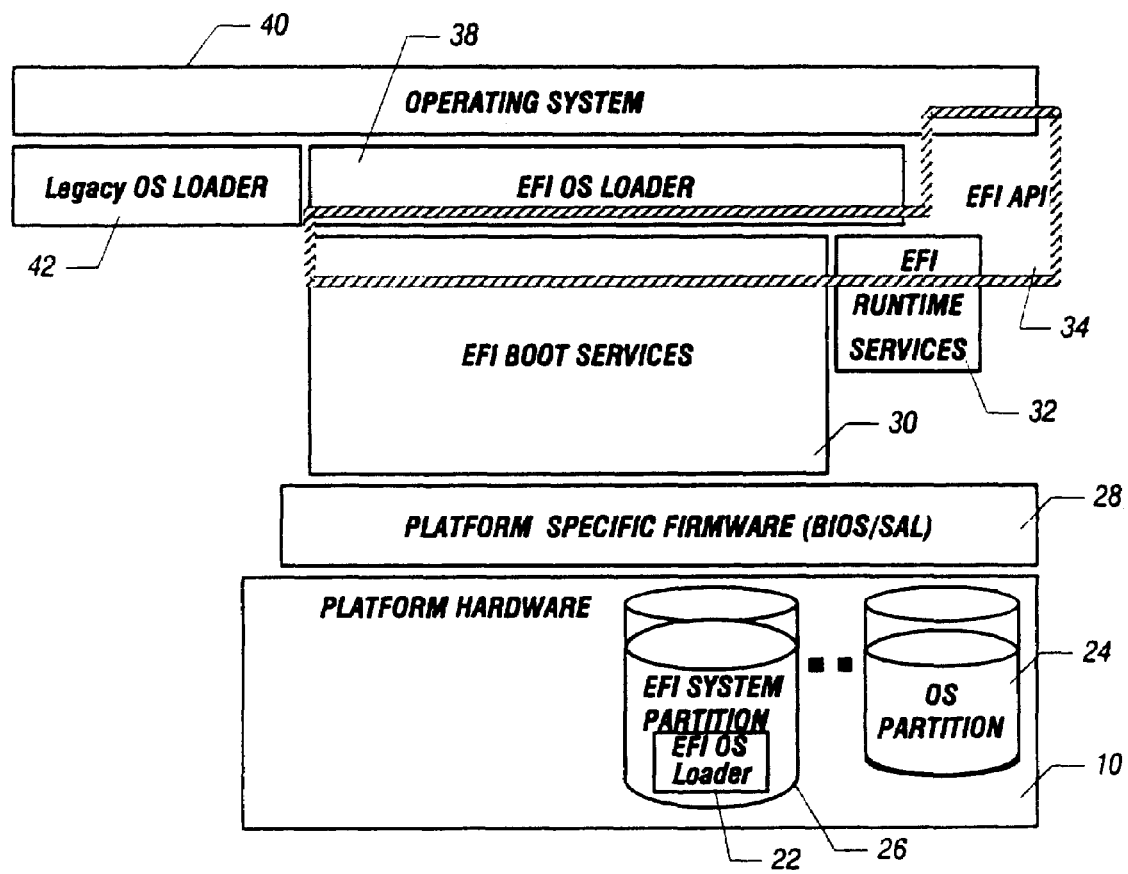
FIG. 2 is a schematic depiction of a software stack using an extensible firmware interface in accordance with one embodiment of the present invention.

Referring to FIG. 2, a system stack for an extensible firmware interface embodiment is illustrated. The extensible firmware interface application program interface 34 has an element that is accessible by the operating system 40 and also has elements accessible by the extensible firmware interface boot services 30. The extensible firmware interface boot services 30 may include drivers, boot devices, protocols, and handlers, as well as timer and memory functions. Thus, an extensible firmware interface embodiment may be implemented which is accessible by the operating system 40.

A legacy operating system loader 42 may conventionally be included, as well as various extensible firmware interface run time services 32. The platform's specific firmware, such as the basic input/output system (BIOS) and system abstraction layer (SAL) 28, may be provided over platform or system 10 hardware. The platform hardware 10 may include a memory partition for the operating system 24 and a partition for the extensible firmware interface system 26. That partition may also include an operating system loader 22 in one embodiment of the present invention.

Figure 3:
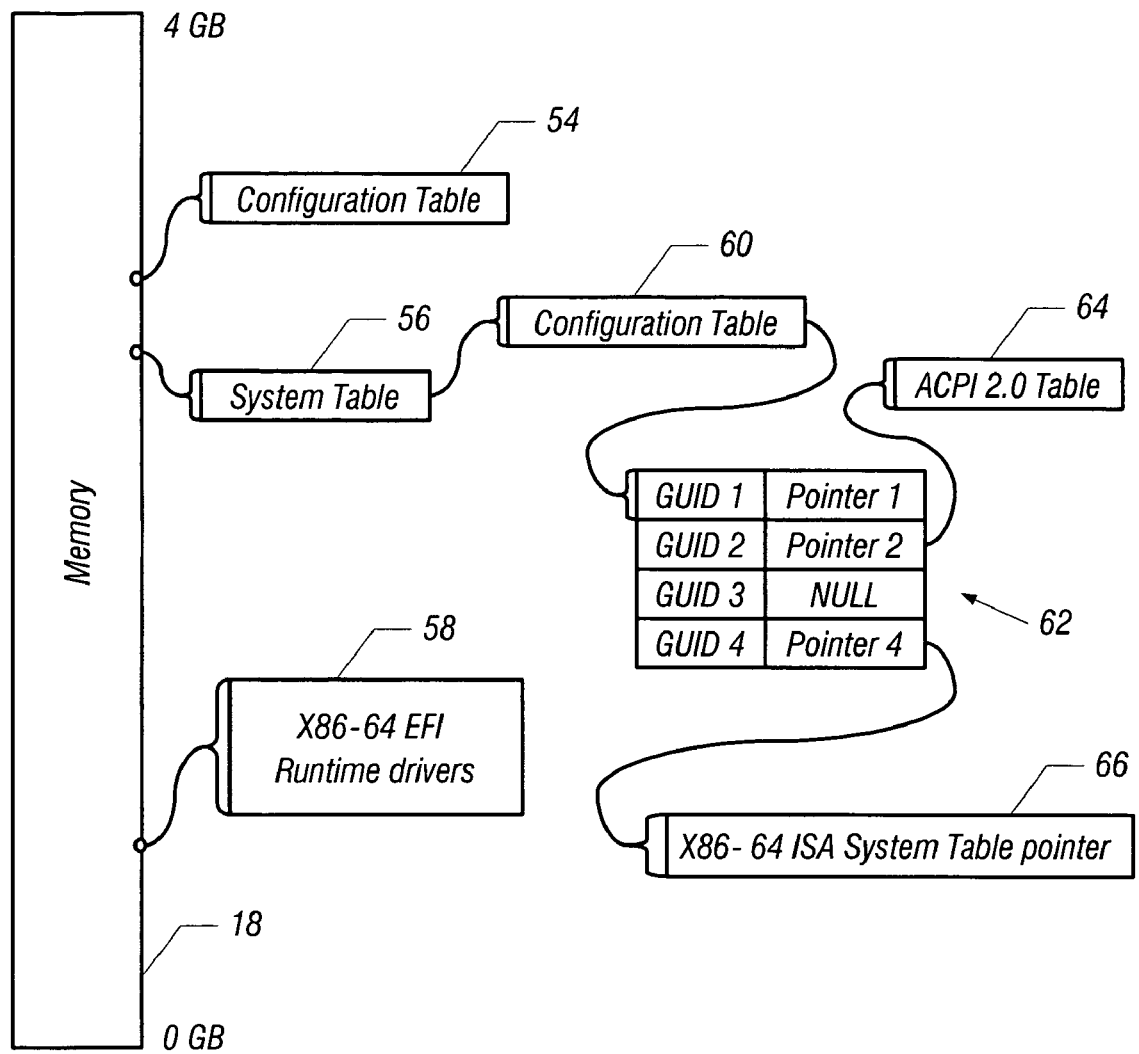
FIG. 3 is a schematic depiction of a firmware table in accordance with one embodiment of the present invention.

Referring to FIG. 3, a region of system memory 18 of four gigabytes may be established initially in one embodiment. That memory region may store a configuration table 54 and a system table 56. The system table 56 may include its own configuration table 60. The configuration table 60 may have globally unique identifiers (GUIDs). For example, referring to the GUID/Pointer pair list 62 from the table 60, the GUIDs 1 and 2 are coupled to a pointer 1 and a pointer 2. The pointer 2 may interface to an Advanced Configuration and Power Interface Specification (ACPI) 2.0 table 64. See ACPI Specification Rev. 2.0, available from Microsoft Corporation, Redmond, Wash. 98052-6399. The GUID 3 may be unused in one embodiment or may be used to specify the boot instruction set architecture in one embodiment.

The GUID 4 uses a pointer 4 to point to a system table pointer 66. The system table pointer 66 implements a 64 bit instruction set architecture in one embodiment of the present invention. Also stored in the memory 18 may be 64 bit extensible firmware interface run time drivers 58 in one embodiment.

Because the extensible firmware interface application program interface 34 provides an entry point that is accessible by the operating system 40, it is callable at any time by the operating system. A kernel can call the extensible firmware interface firmware services 32 from the kernel in the mode in which the processor 12 was originally booted.

The system table 62 includes a pointer to an instruction set system table 66 for handling a different instruction set than the one in which the system booted, such as a 64 bit instruction set architecture. The system table 56 gets handed off to the operating system loader 38 and it looks in the system table 56 to find, for example, the ACPI 2.0 table 64 or the System Management (SM) BIOS tables (not shown in FIG. 3). The ACPI table 64 is used to configure interrupt routing and the number of processors.

The GUID 4 provides a set of run time services that are 64 bit callable in one embodiment of the present invention. However, the GUID 4 can also be used to provide services associated with any instruction set architecture other than the one in which the system booted in.

At this point, through the use of the system table 56, both instruction set architectures have their own associated bits of code that may be called by the operating system. Then, when the operating system goes into a different mode, such as the 64 bit mode, it can discover the new set of run time services (for example that are 64 bit friendly), using the system table 56.

The operating system's kernel may go into the system table 56 and look for the GUID 4. In one embodiment, the GUID 4 is 128 bit value that defines 64 bit callable run time services. The GUID 3, in one embodiment, may be a 128 bit value to specify the current instruction set architecture.

Figure 4:
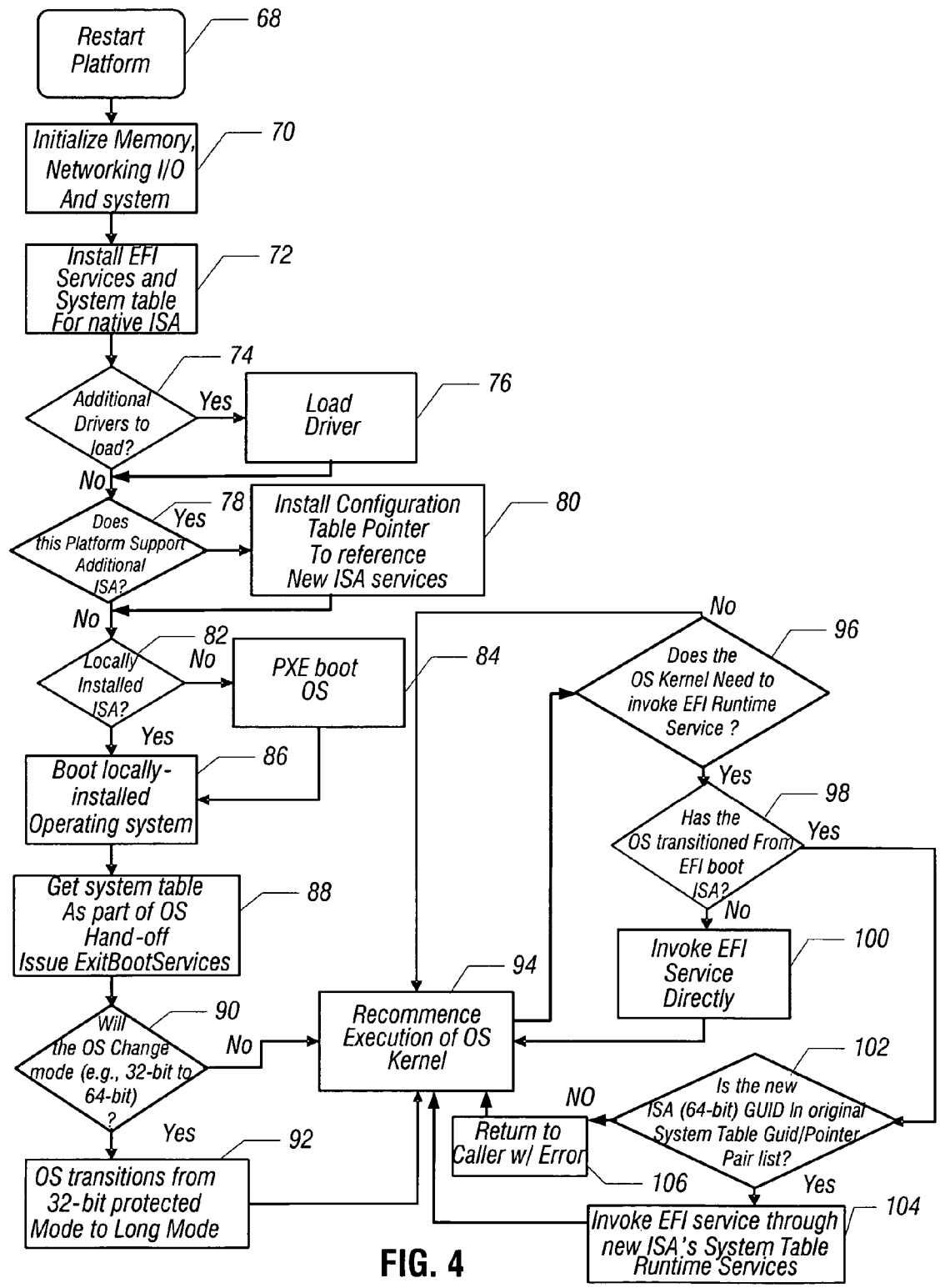
FIG. 4 is a flow chart for software in accordance with one embodiment of the present invention.

Referring to FIG. 4, the software for implementing one embodiment of the present invention begins with a system restart as indicated in block 68. Memory, networking, input/output, and system parameters may be initialized, as indicated in block 70, as part of the boot process. In one embodiment, an EFI services and system table 56 for the native instruction set architecture may be installed as indicated in block 72. The native instruction set architecture is the one used during the boot process. A check at diamond 74 determines whether any additional drivers need to be loaded. If so, those drivers are loaded as indicated in block 76.

A check at diamond 78 determines whether the platform may support an additional instruction set architecture. If so, the configuration table pointer in block 62 is installed to the new instruction set architecture services as indicated in block 80.

A check at diamond 82 determines whether there is any locally installed instruction set architecture. If not, a pre-boot execution environment (PXE) boot operating system 84 may be booted. If so, a locally installed operating system may be booted as indicated in block 86.

Next, a system table is obtained as part of the operating system handoff. An exit boot services command may be issued as indicated in block 88. In diamond 90, a determination is made as to whether, at any time after boot during run time, the operating system wishes to change mode. The mode change can be any change from one instruction set architecture to another. A typical change may be to change from a 32 bit mode to a 64 bit or long mode. If no such operating system change is detected in diamond 90, execution of the operation system kernel recommences as indicated in block 94. If an instruction set architecture change is detected, the operating system transitions to the new instruction set architecture such as the long mode as indicated in block 92.

Execution of the operating system kernel continues with determining whether the operating system kernel needs to invoke some run time service as indicated in diamond 96. If not, execution can continue. But if a run time service is needed, especially in the new instructions set architecture as determined in diamond 96, a check at diamond 98 determines whether the operating system has transitioned from the originally booted instruction set architecture. If the operating system has not transitioned from the extensible firmware interface boot instructions set architecture, then the extensible firmware interface service is invoked directly 100 and the execution of the operating system kernel recommences. If so, a check at diamond 102 determines whether the new instruction set architecture GUID is provided in the original system table 56 GUID)/pointer pair list 62. If so, the associated service, such as the pointer 66, may be called through the instruction set architecture system table's run time services 66, as shown in block 104. If there is no such entry in the list 62, an error may be returned to the caller.

Thus, in accordance with some embodiments of the present invention, heterogeneous instruction set architectures may be called during run time. For example, this ability of the kernel to call different instruction set architectures during run time permits the operating system kernel to call services that are not available with the instruction set architecture used to originally boot the system.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method of invoking heterogeneous instruction set architectures comprising:
   initiating a processor-based system using platform specific firmware, specific to a booting instruction set architecture;
   booting an operating system in the booting instruction set architecture;
   changing the instruction set architecture of the operating system to a first instruction set architecture;
   storing in a firmware storage an extensible firmware interface application program interface having: (a) a first configuration table containing interface services relating to the firmware specific to the booting instruction set architecture, and (b) a system table containing a plurality of platform specific firmware services relating to a plurality of instruction set architectures, wherein the plurality of instruction set architectures includes the first instruction set architecture;
   invoking extensible firmware interface services of the first instruction set architecture to execute on the processor-based system, by accessing the services corresponding to the first instruction set architecture in the system table, wherein the first instruction set architecture is different from the booting instruction set architecture used to initiate the platform; and
   invoking, by an operating system kernel in the platform during runtime one or more services available in the first instruction set architecture that are not available with the booting instruction set architecture.

2. The method of claim 1, wherein the system table has a second configuration table linking a first identifier specifying the first instruction set architecture with a pointer for the first instruction set architecture.

3. The method of claim 2, wherein the first identifier is a globally unique identifier.

4. The method of claim 1, including enabling the operating system kernel booted in a 32 bit instruction set architecture to call services associated with a 64 bit instruction set architecture.

5. The method of claim 1, including associating the booting instruction set architecture with a globally unique identifier during a boot stage.

6. The method of claim 1, wherein invoking services available in the first instruction set architecture further comprises:
   invoking, by the operating system kernel, an application program interface of the extensible firmware interface during run time to locate instruction set architecture services for the booting and the first instruction set architectures.

7. An article comprising a computer-readable medium storing a program of instructions executable by a computer platform to cause the computer platform to perform a method comprising:
   initiating a processor-based system using platform specific firmware, specific to a booting instruction set architecture;

booting an operating system in the booting instruction set architecture;

changing the instruction set architecture of the operating system to a first instruction set architecture;

storing in a firmware storage an extensible firmware interface application program interface having: (a) a first configuration table containing services relating to the firmware specific to the booting instruction set architecture, and (b) a system table containing a plurality of platform specific firmware services relating to a plurality of instruction set architectures, wherein the plurality of instruction set architectures includes the first instruction set architecture;

invoking extensible firmware interface services of the first instruction set architecture to execute on the processor-based system, by accessing the services corresponding to the first instruction set architecture in the system table, wherein the first instruction set architecture is different from the booting instruction set architecture used to initiate the platform; and invoking, by an operating system kernel in the computer platform during runtime, one or more services available in the first instruction set architecture that are not available with the booting instruction set architecture.

8. The article of claim 7, wherein the system table has a second configuration table linking a first identifier specifying the first instruction set architecture with a pointer for the first instruction set architecture.

9. The article of claim 8, wherein the first identifier is a globally unique identifier.

10. The article of claim 7, wherein the operating system kernel is booted in a 32 bit instruction set architecture and calls one or more services associated with a 64 bit instruction set architecture.

11. The article of claim 7, wherein the computer platform associates the booting instruction set architecture with a globally unique identifier during a boot stage.

12. The article of claim 7, wherein invoking services available in the first instruction set architecture further comprises:

invoking, by the operating system kernel, an application program interface of the extensible firmware interface during run time to locate instruction set architecture services for the booting and the first instruction set architectures.

13. A platform comprising: a processor; and a storage storing a program of instructions executable by the platform to cause the platform to perform a method including the steps of:

initiating a processor-based system using platform specific firmware, specific to a booting instruction set architecture;

booting an operating system in the booting instruction set architecture;

changing the instruction set architecture of the operating system to a first instruction set architecture;

storing in a firmware storage an extensible firmware interface application program interface having: (a) a first configuration table containing interface services relating to the firmware specific to the booting instruction set architecture, and (b) a system table containing a plurality of platform specific firmware services relating to a plurality of instruction set architectures, wherein the plurality of instruction set architectures includes the first instruction set architecture;

invoking extensible firmware interface services of the first instruction set architecture to execute on the processor-based system, by accessing the services corresponding to the first instruction set architecture in the system table, wherein the first instruction set architecture is different from the booting instruction set architecture used to initiate the platform; and invoking, by an operating system kernel in the platform during runtime, one or more services available in the first instruction set architecture that are not available with the booting instruction set architecture.

14. The platform of claim 13, wherein the system table has a second configuration table linking a first identifier specifying the first instruction set architecture with a pointer for the first instruction set architecture.

15. The platform of claim 14, wherein the first identifier is a globally unique identifier.

16. The platform of claim 13, wherein the operating system kernel is booted in a 32 bit instruction set architecture and calls one or more services associated with a 64 bit instruction set architecture.

17. The platform of claim 13, wherein the platform associates the booting instruction set architecture with a globally unique identifier during a boot stage.

18. The platform of claim 13, wherein invoking services available in the first instruction set architecture further comprises:

invoking, by the operating system kernel, an application program interface of the extensible firmware interface during run time to locate instruction set architecture services for the booting and the first instruction set architectures.

* * * * *